Sept. 4, 1962 P. JEAN-MARIE BERGER 3,052,174
AUTOMATIC CONTROL SYSTEM FOR OFFSET AND THE LIKE
PHOTO-MECHANICAL COPYING MACHINES
Filed June 8, 1959 7 Sheets-Sheet 1

INVENTOR
PAUL JEAN-MARIE BERGER
By Irwin S. Thompson
ATTY.

INVENTOR
PAUL JEAN-MARIE BERGER
By Irwin S. Thompson
ATTY.

INVENTOR
PAUL JEAN-MARIE BERGER
By Irvin S. Thompson
ATTY.

United States Patent Office 3,052,174
Patented Sept. 4, 1962

3,052,174
AUTOMATIC CONTROL SYSTEM FOR OFFSET AND THE LIKE PHOTO-MECHANICAL COPYING MACHINES
Paul Jean-Marie Berger, Noisy-le-Grand, France, assignor to Societe Victor Bouzard & Ses Fils, Paris, France, a corporation of France
Filed June 8, 1959, Ser. No. 818,933
Claims priority, application France June 10, 1958
32 Claims. (Cl. 95—73)

My invention has for its object improvements in offset and the like photographic copying machines of the type including a frame adapted to be driven by two motors, so as to assume two independent movements in a plane parallel with a predetermined surface and to stand still for a series of predetermined positions, with a view to executing an operation in each of said positions.

The sensitive surface is stationary for instance while a holder or carriage for a negative associated with a lamp is arranged inside a frame having an adjustable position in space. Said frame may be fitted on a member adapted to be shifted in a plane parallel with the photosensitive surface. Such negative-carrying or document-carrying means may be constituted by a first carriage slidingly carried in guideways formed in a second carriage which slides in its turn on guideways rigid with the support perpendicularly to the preceding guideways; said arrangement allows bringing the negative-carrying means into registry with any desired location of the support. Means are also provided for uring under a preferably uniform pressure the negative into contact with the sensitive support for printing purposes.

In the conventional machines of this type, the two translational movements of the first carriage on the second carriage in a first predetermined direction and of the second carriage over the frame in a direction perpendicular to the first direction are generally obtained by a manual control, a screw and a crank being provided for each of the two movements.

A third control system should be provided for the vertical movements exerting a pressure on the negative-carrying means and lamp, said control system including for instance a pump feeding fluid into jacks arranged symmetrically over an element rigid with the second carrier inside which may slide vertically the negative holder.

My invention has for its object entirely automatic control means for machines of this type, which allow executing a number of operations which may be extremely different in accordance with a predetermined schedule defined by a perforated card.

According to a primary object of my invention, a pulse transmitter associated with each of the two motors controlling the frame is adapted to produce an electric pulse for each elementary predetermined movement produced by the motor considered, while a counter of the so-called single coordinate type counts these pulses for comparison with a previously given amount and produces a succession of slowing down signals when the result of the comparison made passes through a series of predetermined values or thresholds, the last threshold being zero and producing a stop signal, either of the two motors being simultaneously connected for forward operation for control by a speed-reducing gear adapted to reduce its speed under the action of said slowing down signals, while the other motor is connected for reaward operation and is controlled by slowing down means operating for a first predetermined position and also by stopping means operating for a second predetermined position.

Said arrangement allows executing readily with a great accuracy the automatic control of even comparatively complex schedules or programmes, since the movements controlled by a counter of the single coordinate type are always executed in a predetermined direction which I will term "the forward direction" for each motor, while the reverse movement in the opposite direction or rearward direction stops for a predetermined position after slowing down upon passage through a predetermined position.

According to a preferred embodiment, the two movements are translational movements along two orthogonal reference axes and are controlled by screws, the shaft on which each screw is formed being controlled by a motor and carrying a toothed disc, while each pulse producer includes a photo-cell illuminated by a luminous beam modulated by the teeth of the corresponding toothed disc. The elementary movement forming the counting unit corresponds thus to a rotation of the screw by an angle equal to the angular spacing of two adjacent teeth. All the movements being counted starting from the passage through a predetermined postion, the speeds at which the successive positions are to be reached are controlled by the distances which are still to be travelled over and have always the same value until a stopping is produced by a suitable brake, preferably of an electromagnetic type, which brake is released by a stop signal, so that the accuracy obtained may be very high.

According to an important feature of my invention, each toothed disk referred to hereinabove includes in registry with each of the teeth located along a fraction of its periphery a neutralizing port, while an auxiliary cell inserted in parallel with the cell of each pulse produced is adapted to be illuminated through said neutralizing ports by an auxiliary beam, said fraction of the periphery extending between two points of the periphery of the disc, in a manner such that the first of said points passes in registry with the photo-cells at the moment of the passage through a reference axis, while the second point is located beyond the location of said cells in the position corresponding to stoppage.

This arrangement defines with perfect accuracy the beginning of each counting procedure, which corresponds to the moment of the passage during forward movement through the reference axis, before which moment the pulses produced by the neutralizing holes wipe out as it were the counting pulses by engaging the intervals between said pulses.

The features and advantages of my invention will appear clearly in the reading of the following description, reference being made by way of example to the accompanying drawings, wherein.

Figure 1:
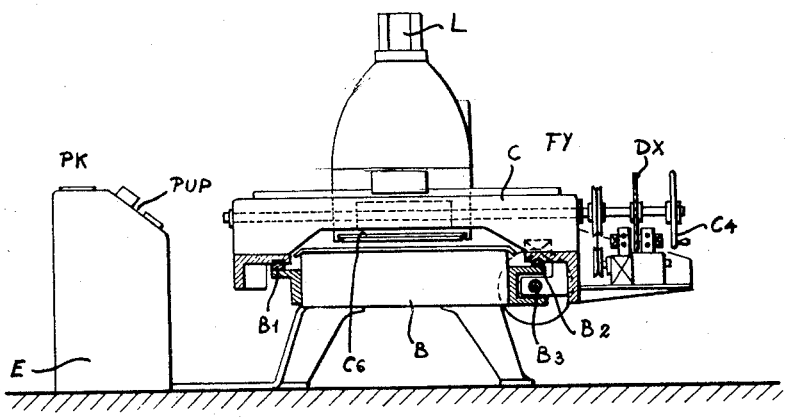
FIG. 1 is a diagrammatic elevational view of a machine according to my invention.
Figure 2:
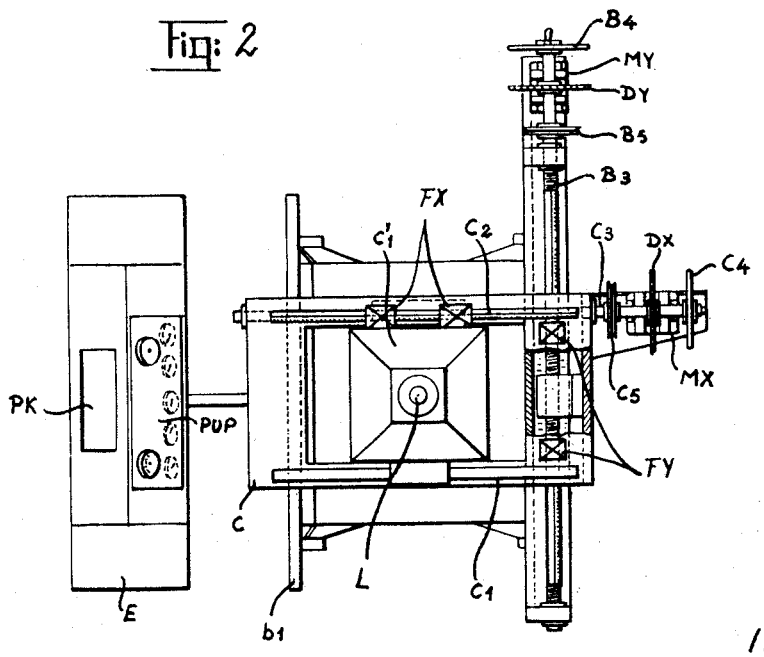
FIG. 2 is a corresponding plan view.

In the embodiment illustrated by way of example in FIGS. 1 and 2, the copying machine to which the control system is applied includes a frame B carrying two spaced guideways B1 and B2 extending laterally and over which runs the carriage C, the guideway B1 forming a race and B2 a runway. The movements of the carriage over the frame B are controlled by a screw or worm B3 located in registry with and underneath the guideway B2. Said screw is controlled either by hand through a crank B4 or by means of an electric motor MY through the agency of a speed-reducing gear B5 including a belt.

The carriage C includes in its turn two similar guideways C1 and C2 extending in a direction perpendicular to the guideways B1 and B2 and over which may run a second carriage C'. The movements of the latter over the first carriage C are controlled by a screw or worm C3 either by means of a crank C4 or by a motor MX through the agency of a pulley and belt speed-reducing means C5. The shafts carrying the screws C3 and B3 carry each a toothed disc DX, DY respectively, the part played by which will appear clearly hereinafter.

The guiding of the carriage C over the guideway B2 and that of the carriage C' over the guideway C2 are obtained by sliders forming the pole-pieces of the corresponding electromagnetic brakes FX, FY.

In the carriage C' may vertically slide a document-holder C'1 carrying a lamp L and adapted to receive a negative-carrier C6. The document-holder may be lowered or raised under the action of a suitable control system which I may designate hereinafter as a pressure-producing motor. The upper surface of the frame B forms a table or bed adapted to receive, through the agency of a rubber blanket the light-sensitive surface constituted for instance by a metallic photo-engraved plate carrying a photo-sensitive layer.

A system of automatic control means is fitted inside a cabinet E located adjacent the machine and including a control desk PUP underneath a card-carrying arrangement PK.

Figure 3:
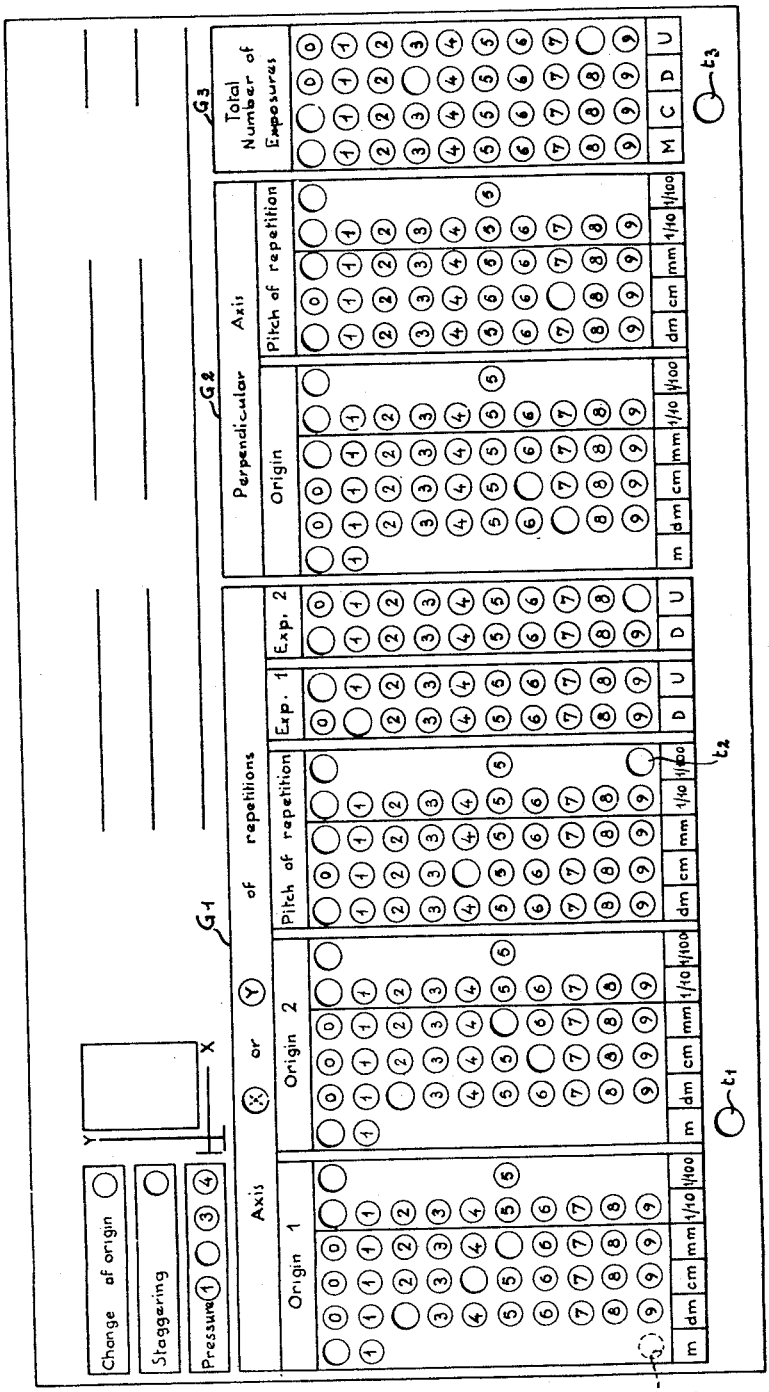
FIG. 3 shows, by way of example, a perforated card to be used for controlling the machine, the perforations of said card corresponding to a particular schedule or programme.
Figure 4:
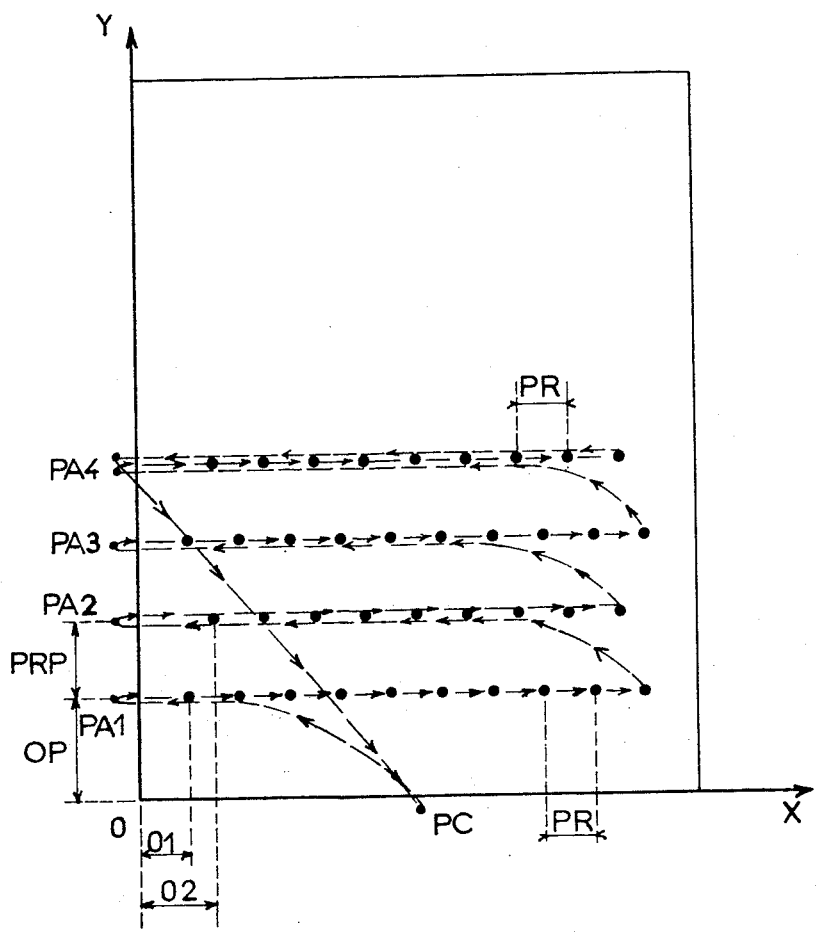
FIG. 4 is a diagram showing the work executed in accordance with such a schedule.

FIG. 3 shows an example of a card serving for the control of the machine described and FIG. 4 shows diagrammatically, the progression of the apparatus over a sensitive surface between the successive positions to be occupied by it in accordance with a given programme. The card is provided primarily with two dissymmetrical centering holes $t1$ and $t3$ providing for the correct positioning of the card inside the support which is to carry it. A further hole $t2$ is provided in registry with a contact-piece facing the location of said hole $t2$ in the card support, the closing of a circuit through said contact-piece being required for energization of the machine.

A non-perforated location $ks$ is provided in registry with a further contact-piece, the opening of a circuit controlled by said contact-piece being also necessary for energization of the machine.

A series of eight areas including each a number of columns are provided for the perforations of the different elements of the operation programme to be executed on the machine. Said areas are divided into three groups: a first group G1 including five areas, a second group G2 including two areas and a third group G3 constituted by a single area.

The first group G1 carries the information or data corresponding to the direction of the repetitions, to the coordinates of the origin of each line of repetition and to the number of exposures in each line.

The operator may decide, as a matter of fact, and as desired, that the repetitions are executed along the direction of the axis OX (see also FIGS. 1, 2 and 4) which is the direction of movement of the carriage C or else in the direction of movement OY of the carriage C1. This selection is attested by the perforation X or Y, the location X being perforated in the case of the example considered of the programme illustrated in FIG. 4.

The first area entitled "origin 1" of the group G1 includes six columns and it is intended for the definition of the abscissa 01 (FIG. 4) of the position of the first exposure on the first row. The six columns of said areas define respectively the number of meters m, decimeters dm, centimeters cm, millimeters mm, tenth of a millimeter ($1/10$) and hundredths of a millimeter ($1/100$) of said abscissa of measurement. The meter-indicating column carries in the present case only two possible perforations "0" and "1." The column of the hundredths of a millimeter includes only two perforations "0" and "5." This abscissa and all other measurements of coordinates are consequently defined as multiples of elementary displacements by $5/100$ of a mm., but, for the reasons given hereinafter, they are respected within an accuracy above $1/100$ of a mm. In the case of the example considered, the perforated value for said measurement is equal to 245.00 mm.

The second area of the group G1 gives out the abscissa of the point 02 of the first exposure of the second row; the perforation shown in the example of FIG. 3 corresponds to a value of 265.00 mm. It should be remarked that the second area in the group G1 serves only in the case where the operation is to be executed in staggered sequence, as in the case illustrated by way of example in FIG. 4 or in the case of a change of origin, i.e. in the case where the abscissae of the first exposure of alternate rows are to take two different values 01 and 02. It will be remarked that in such cases it is also necessary to perforate the location designated by the reference words "staggering" or "change of origin" provided for this purpose in the upper left-hand side of the card.

The third area of the group G1 indicates the pitch of repetition and it is intended for defining the value of the distance or abscissa PR of FIG. 4. Said area includes five columns, as illustrated in the drawing, the perforated value in the case of the example considered being equal to 40.00 mm.

The following area includes only two columns corresponding to tens and units and shows the number of exposures in each row. The number P1 of exposures as perforated in the case of the example illustrated is equal to 10. Said area is followed by a similar area adapted to be used in the case of a staggered operation and giving the number of exposures P2 in the second row, said number being equal to 9 in the case considered.

The group G2 includes two areas carrying the information corresponding to the coordinate along the direction of the axis perpendicular to the axis of repetition, to wit: OY (FIG. 4), in the case of the example considered. The first of the two areas gives the measurement corresponding to the ordinate OP at the origin of the first row: said area includes six columns, as in the case of the area "origin 1" and "origin 2," the perforated value in the case illustrated being 760.00 mm. The second area of the group G2 gives out the pitch of repetition in the direction of the perpendicular axis PRP, the perforated value being shown in this case as equal to 70 mm.

The single area of the group G3 gives out the total desired number of exposures TP. Said area includes, in the case illustrated, four columns corresponding respectively to thousands M, hundreds C, tens D and units U. The perforated value is, in the case illustrated and in accordance with FIG. 4, equal to 38.

It will be remarked that if the photo-sensitive surface is not entirely exposed through the negative associated therewith, it is possible to expose thereon a second negative, the size of which is different from the size of the former. In this case, a further perforated card carrying the corresponding measurements is required. It is possible that the last exposures of the first negative are not executed at the end of a row. In order to allow making use of the room left free in this row, and to continue the following rows, a special perforation is provided in the second card for the "change of origin." The room reserved for this purpose on the card is shown in the upper left-hand side of the latter.

In the area entitled "pressure," four locations numbered from 1 to 4 are provided, the perforations of which show the selection made between four different pressures which the pressure-producing motor is adapted to apply to the document-carrying support.

The card may be made of strong paper or any other insulating material.

Figure 5:
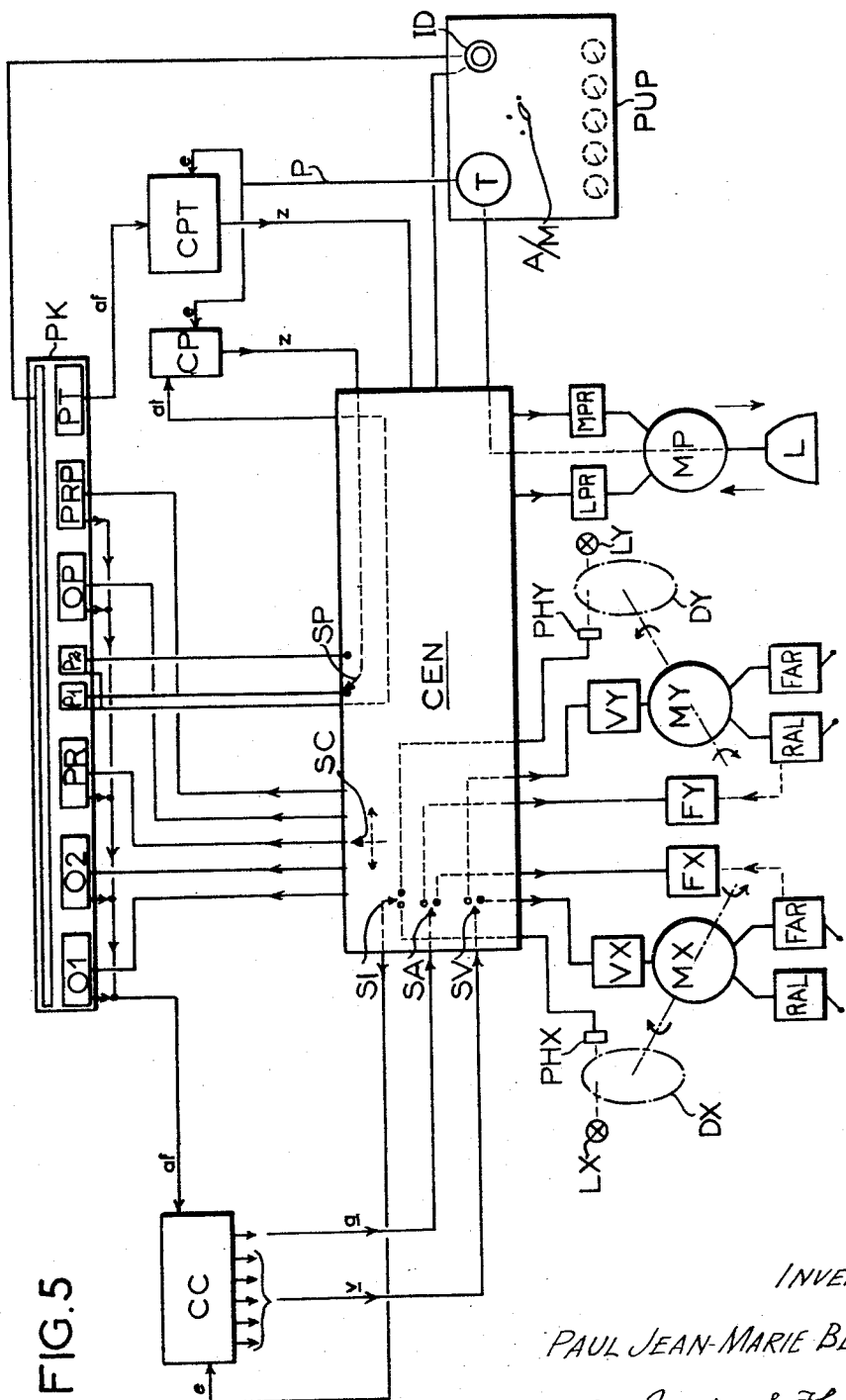
FIG. 5 is a general wiring diagram of the machine.

FIG. 5 shows a general simplified diagram of the automatic control means. The diagram shows first the two translation-controlling motors MX and MY, which control the movements of the support along two perpendicular directions OX and OY. L designates the lamp associated with the document-carrying support and MP designates the arrangement or motor producing the pressure leading either to the lowering of said support and its application over the support with a predetermined pressure, or else, the rising of the support into its upper position prior to a further displacement.

The execution of these two movements is obtained selectively through the agency of relays designated respectively by the references MPR and LPR. The operation of the motors MX and MY controlling the translational movements is obtained in a different manner according to the direction of operation, it being understood that I term "forward movement" the operation producing a movement away from the origin of the axis associated with each motor and "rearward movement" the opposite movement. Thus, the forward movement of the motor MX produces an increase in the abscissa of the document-carrying support. During forward movement, the speed of rotation of the motor is controlled by a change speed or speed-modifying mechanism VX adapted to slow down gradually the motor when its travel nears its end, the stoppage being obtained by the brake FX. In contradistinction, rearward movement is executed at the normal operative speed of the motor and it continues until the origin of the axis has been passed through; for a predetermined position ahead of said point corresponding to the passage through the origin, a switch RAL of an extremely small size, controlled by a release cam or slope produces a slowing down and a second switch of an extremely small size FAR is controlled by a second cam released at the moment of the passage through the reference axis, so as to produce the stoppage at a predetermined distance from said axis, and to feed the corresponding brake FX. The motor MY is similarly associated with speed-varying means VY, an electromagnetic brake FY and two reduced-size switches RAL and FAR for slowing down and stopping rearward movement.

The members controlling forward movement VX–VY–FX–FY for the translation-producing motor and the control members MPR and LPR of the pressure-producing means receive their orders from a central station CEN providing for the desired sequence of operations, as disclosed with further detail hereinafter. To said central station are connected various members adapted to define the operation of the machine, to wit: the control desk PUP, the card-holder PK, a coordinate counter CC, a counter CP of the number of exposures per row and a counter CPT of the total number of exposures. The control desk carries in particular a switch A/M which allows selection between automatic, semi-automatic and manual control, a starting switch ID, a time switch T defining the duration of exposure through the duration of feeding of the lamp L at each exposure, said time switch sending also through the connection P, after each exposure, a counting pulse into the input of each of the counters CP and CPT. The card-carrying holder PK, the details of which will be disclosed hereinafter, includes an area registering with each area of the perforated card, and these areas are designated in FIG. 5 by corresponding references 01, 02, PR, P1, P2, OP, PRP and PT. Each area is adapted to transmit corresponding indication pulses to the indication input af of the counter. Thus, indication pulses may be sent into the coordinate counter CC by each of the areas 01, 02, PR, OP and PRP, the different corresponding output wires being cabled in parallel for connection with the corresponding points of the coordinate counter. A coordinate selecting arrangement SC forming part of the sequence-controlling central station CEN defines the areas to be operated for the different stages of execution of the programme. A further selector SP connects with the indication or information input of the counter CP of the number of exposures per row, either the area P1 or the area P2. Lastly, the area PT is connected permanently with the indication or information input of the counter CPT of the total number of exposures.

The pulses applied to the input of the coordinate counter CC are fed according to the selection made by the impulse selector S1 of the sequence-controlling central station, by either of the two photo-cells PHX, PHY which are associated respectively with the toothed disc DX corresponding to the movement X and with the toothed disc DY corresponding to the movement along OY. Said cells are illuminated by the beam of light from a corresponding lamp LX, LY, said beam being modulated by the notches of the associated disc.

In the case of the example considered, each of the toothed discs is provided with as many recesses and projections as there are lengths equal to $5/100$ of a mm. contained in the length of the pitch of the screw carrying the disc. In other words, an angular shifting of a tooth of the disc corresponds to a linear movement of the nut over the screw which is equal to $5/100$ of a mm., the accuracy of the positioning remaining, as explained hereinafter, of the order of $1/100$ of a mm. In order to further the transmission of the pulses in each cell between the machine and the cabinet housing the counters and amplifiers required, the cell controls a small modulator adjacent thereto and which need not be described with any detail. The carrier frequency produced by said modulator throughout the duration of each pulse is sent by a coaxial cable to the cabinet.

The coordinate counter CC is provided, in the case illustrated, with five outputs designated as a whole by $v$ on the diagram of FIG. 5, said outputs leading, according to the selection made by the sequence-controlling central station, through a speed-changing selector SV, towards either of the forward speed-varying means VX and VY. A sixth output for the counter CC produces, as shown at $s$, a stoppage signal which may be directed through a further selector SA at the central station, either towards the brake FX or towards the brake FY.

Figure 6:
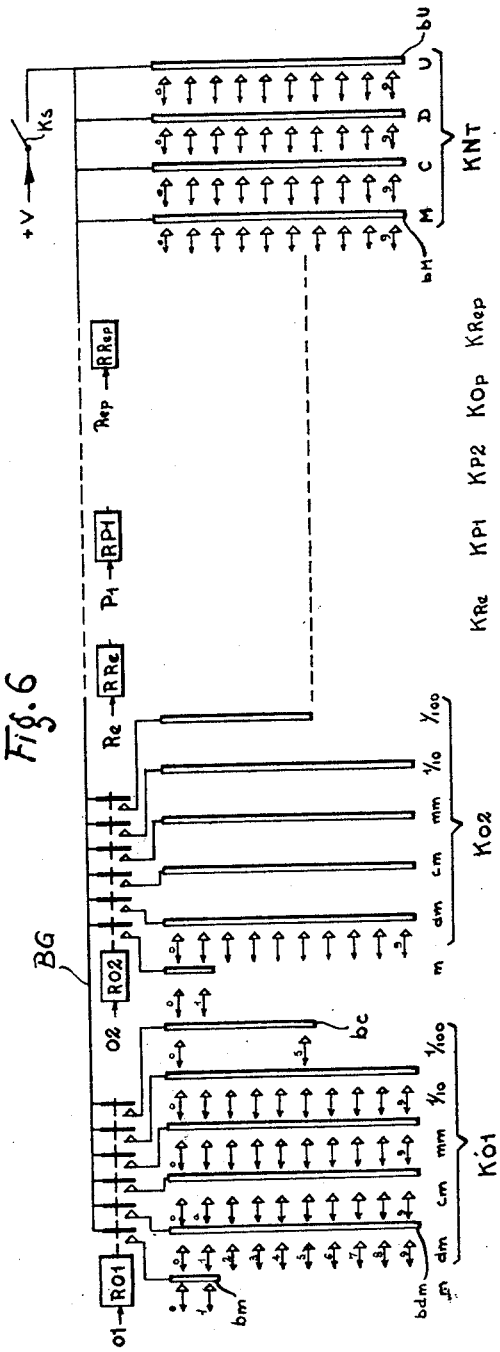
FIG. 6 is a wiring diagram of the cover of the card holder.

FIG. 6 is a simplified diagram of the card-holding means. Said means include, at the bottom of the actual holder for the perforated card, a guiding projection subjected to the pressure of a spring for registration with each location adapted to be perforated in the card. FIG. 6 shows, in the area K01 corresponding to the "origin 1" area of the card, a column $m$ with two contact-forming projections "0" and "1" in registry with the corresponding positions of the meter-indicating column in said area of the card, ten contact-forming projections "0" to "9" in each of the columns dm, cm and mm showing respectively the decimeters, the centimeters and the millimeters, as also in the column showing the tenths of a mm. at $1/10$, while only two contact-making projections "0" and "5" are provided in the column $1/100$ of the hundredths of a mm.

The contact area K02 corresponds to the area "origin 2" of the card and so on, up to the last area corresponding to the total number of exposures to which corresponds the contact area KNT. In the diagram of FIG. 6, the contact-making projections corresponding to the perforations "change of origin," "staggering" and "pressure" have been omitted.

The cover adapted to be lowered over the support of the perforated card includes for registry with each column of the card a contact-making bar such as bm above the two-position meter-indicating column, a contact-making bar dbm extending over the ten positions of the decimeter-indicating column and so on, up to the column of the hundredths of a mm. for which a contact-making bar *bc* extends over the positions "0" and "5" of said column. The six bars of the area K01 may be simultaneously connected, through the closing of a so-called "indication or information relay" R01 provided with six contact-pieces, with the bus bar BG at the operative voltage "+V," which is supplied to the bar BG through the agency of the safety contact-pieces *ks* and *t2*, the closing and the opening of which are controlled respectively, as already mentioned, by the car inserted in its support.

The closing of the indication relay R01 is controlled by the sequence-controlling central station upon appearance of an indication signal "01," as disclosed with further detail hereinafter. Similarly, an indication signal "02" controls the closing of the indicating relay R02 provided also with six contact-pieces in the area K02. An indication order R*e* controls the closing of the indication relay "RR*e*" provided with five contact-pieces and associated with the pitch of repetition area. A signal of indication P1 controls the closing of a relay RP1 provided with two contact-pieces and associated with the "exposure 1" area and so on, up to the indication relay "R–R*ep*" controlled by an indication order or signal "R*ep*" which produces the connection with the bus bar RG of the five columns of the "pitch of repetition-perpendicular axis" area. It should also be remarked that the four connecting bars *bm* to *bu* in the area KNT are permanently connected with the bus bar BG.

From each contact-making projection of the card support there starts an indication-producing connection towards a corresponding indication input of an associated counter. All the positioning areas, to wit: the areas "origin 1," "origin 2," "pitch of repetition," "origin and perpendicular axis," "pitch of repetition and perpendicular axis" are associated, as already mentioned, with a same counter which is the coordinate counter CC. Consequently, the contact-making projections which occupy corresponding positions in these various areas of the card support are all connected in parallel in a common cable; thus, for instance, the contact-making projection "0" of the meter-indicating column in the area K01 is in parallel with the corresponding projection in the area K02 for the "origin 2," in the area K0*p* which is not shown in detail in FIG. 6 and in the area "origin and perpendicular axis."

The positions of the following columns of decimeters, centimeters, down to hundredths of a mm. are also connected in common in the areas KR*e* and KR*ep* for the pitch of repetition.

The corresponding contact-making projections in the two areas KP1 and KP2 showing the number of exposures per row are also connected in parallel and form the starting points for the connections feeding the indication signals into the counter CP of the number of exposures per row. Lastly, the forty contact-making projections in the area KNT are connected separately and independently with the forty inputs feeding the indication signals to the counter CPT of the total number of exposures.

Figure 7:
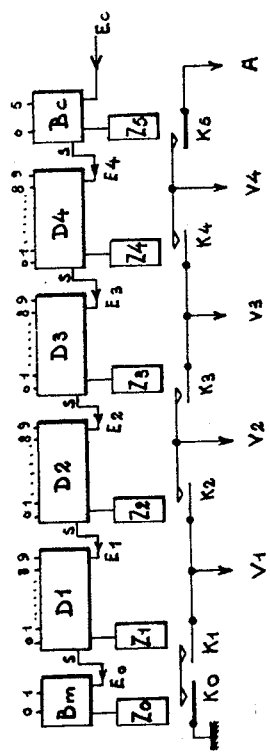
FIG. 7 is a simplified diagram of the coordinate counter.

FIG. 7 is a simplified wiring diagram of the coordinate counter CC. Said counter cooperates, as already mentioned, selectively with the different position areas of the card support and includes a relay B*m* having two stable positions and provided with two indication inputs "0" and "1" cooperating with the two positions afforded by the meter column, four devices D1 to D4 provided each with ten indication inputs and each of which cooperates with the corresponding decimeter, centimeter, millimeter or tenth of a mm. columns, a further relay B*c* having two stable positions and provided with two inputs "0" and "5" and cooperating with the hundredth of a mm. column. Each two-position relay or ten-input device forms a ring-shaped counter of the type including for instance one tube for each indication input, a pulse input E and an output S towards the next ten-input device as well-known in the art. A zero relay Z0 . . . Z5 is associated furthermore with the zero tubes of each two-position relay or of the ten-input device, said zero relay entering its operative position when the associated zero tube is in its operative condition.

During operation of the apparatus, the counter is first adapted to show the coordinate to be travelled over, while the pulses to be applied during the execution of the movement to the input E*c* of the counter, which pulses illustrate each, in the case of the example considered, a shifting by five hundredths of a mm. are subtracted by the counter from the original indication of the coordinate. During the execution of the movement, an increasing number of zero relays considered from the left-hand side to the right-hand side of FIG. 7 are consequently set permanently and in succession in their operative positions. As apparent from inspection of the diagram, when Z0 and Z1 are operative, the closing of the two contact-pieces K0 and K1 produces the grounding of a starting circuit V1; said connection is obtained at the moment at which the distance remaining to be travelled over drops underneath one decimeter. The starting circuit V2 is grounded in its turn through the contact-piece K2 of the relay Z2 at the moment at which the distance to be travelled over drops underneath one centimeter. The starting circuit V3 is grounded in its turn through K3 when the remaining distance to be travelled over drops underneath one millimeter. The starting circuit V4 is similarly grounded through K4 when the distance to be travelled over drops underneath one tenth of a mm. and, lastly, the starting circuit A is grounded through K5 exactly at the moment of the input of a pulse produced by travelling over the last fraction of five hundredths of a mm. of the distance to be travelled over. The four starting circuits V1 to V4 are connected with four corresponding inputs of the change speed system which may be of any type well known per se, capable of making the motor controlled thereby assume decreasing speeds. Thus, for instance, each of the motors may be associated with a change speed system equipped with electromagnetic clutches. In the example considered, the selected number of speeds is equal to five, although, obviously, this number may be chosen as desired. There is consequently a speed for meters and decimeters and decreasing speeds produced in succession through the grounding of the starting circuits V1 to V4. The starting circuits V1 and V2 will control, for instance through the agency of suitable amplifiers, the connections and disconnections of the pinions or pulleys corresponding to the desired speeds, while the motors continue revolving under normal high running conditions, whereas at the end of the travel, the change speed system remains in the position corresponding to the speed of progression by millimeters and the starting circuits V3 and V4 act on an electronic speed-modifying device of the thyratron type for instance, so as to produce a lowering of the speed of the motor through a reduction of the voltage feeding the latter. The starting circuit A produces both the complete opening of the circuit feeding the motor and the feeding of the windings of the electromagnetic brakes secured to the carriage and urging the latter onto its guideways.

Obviously, the different changes in speed may be obtained entirely by a change speed system or entirely by electronic speed-modifying means or else through any other suitable means.

Figure 8:
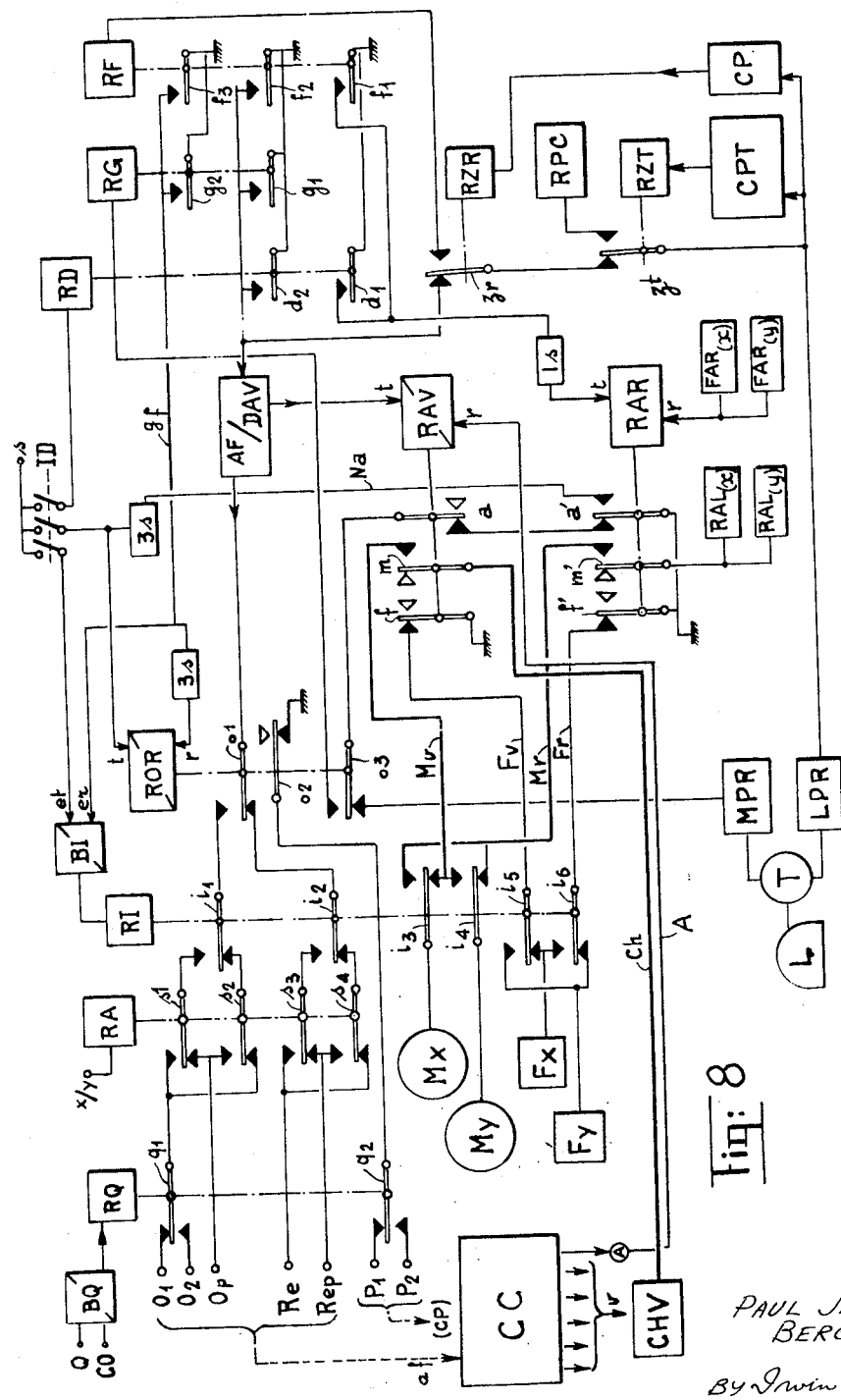
FIG. 8 is a simplified diagram of the central station controlling the sequence of the operations.

Once the apparatus is held fast on a predetermined coordinate, the sequence-defining central station controls the operations which are to be executed and I will now describe said central station, reference being made to FIG. 8.

In the diagrammatic FIG. 8, a number of parts already illustrated in the preceding figures have been reproduced again for sake of clarity of the disclosure, to wit:

The coordinate counter CC is illustrated in the present case with a total output *v* acting on the change speed system illustrated diagrammatically at CHV, while its output A feeds the stoppage signal or order;

The counter CP for the number of exposures in a row and the counter CPT for the total number of exposures;

The system formed by the time switch T carried by the control desk on the one hand and the lamp L, the members MPR for the production of pressure and LPR for the release of pressure which are associated with the document holder, on the other hand;

The motors MX and MY and the brakes FX and FY;

The switches or the like parts RAL for slowing down and FAR for terminating the rearward travel.

All the parts of the diagram are assumed to be connected with a supply of energy which is not illustrated so that their feed implies the closing of a grounding connection.

To simplify the diagram, a simple connection Ch illustrates symbolically the action of the change speed system, which action is transferred through the contact m of a so-called forward movement relay RAV onto the forward motion connection Mv, whenever said relay is operative and only then. A second contact-piece a controlled by said relay is closed when the latter is inoperative, as is also the third contact-piece f, so as to allow the feeding through the connection Fv of either of the brakes FX or FY adapted to serve for forward movement.

A similar relay RAR serving for rearward movement includes similarly three corresponding movable contact-pieces f', m' and a', of which the first one ensures the grounding of the rear braking connection Fr when RAR is inoperative, while the second relay m' connects the wire Mr provided for rearward motion with the slowing down means RAL when RAR is operative, and, lastly, the third contact-piece a' provides for the grounding of the contact-piece a of the forward motion relay when RAR is inoperative and of the connection Na when the relay RAR is operative.

Each of the relays RAV and RAR is of the double stability type adapted to be set in a permanent manner in either of its so-called inoperative and operative positions under the action of pulses applied respectively to the inputs designated by the references t and r. Thus, the pulse providing operation of the forward motion relay RAV is produced by a so-called indicating and forward starting member AF/DAV, while the pulse producing its inoperative position is fed by the stopping signal output A controlled by the coordinate counter CC. The pulse setting in its operative position the rear movement relay RAR is controlled on the other hand by the closing of either of the two contact-pieces d1 of a relay RD or f1 of a relay RF through the agency of the delaying means 1s with the introduction of a lag, say by one second. The pulse for setting the rearward motion relay in its inoperative position is provided by the operation of either of the switches FAR terminating the rearward motion.

The upper left-hand part of the diagram of FIG. 8 illustrates the outputs of the information-switching signals for the different areas of the card-holding means with a view to indicating their condition on suitable counters. Thus, it is possible to feed selectively in the desired sequence the control outputs 01 of the relay R01 corresponding to the indications for "origin 1," the control output 02 for the indication relay R02 corresponding to "origin 2," the output Op controlling the relay R0p providing the indication for "origin and perpendicular axis," the output Re of the relay R indicating the pitch of repetition, the output Rep controlling the relay RRep providing the indications for the "pitch of repetition and perpendicular axis." On the other hand, the two outputs P1 and P2 control respectively the relays RP1 and RP2 for the indications "exposure 1" and "exposure 2" associated with the counter CP of the number of exposures in the row.

These operations for the selection of the indications to be transmitted are ensured in particular by four relays in series connection, to wit, as illustrated from the left-hand to the right-hand side of the diagram:

A so-called staggering relay RQ;
An axis selector relay RA;
A reversing relay RI;
A relay ROR for "origin or repetition."

The staggering relay RQ is controlled by a relay BQ having two positions of stability and of which the change of condition may be controlled through the application of a signal to either of the two inputs Q and CO of said relay.

The staggering relay RQ controls two movable contact-pieces q1 and q2 connected for the inoperative position of the relay respectively with 01 and P1 and for the operative position of the relay respectively with 02 and P2.

The axis-selecting relay RA is fed through the agency of the contacting projection associated with either of the perforations X and Y of the card (FIG. 3), say X in the case considered, so that said relay remains inoperative for the programme considered, the position X being then perforated. Said relay includes four contact-pieces s1 ... s4 forming reversing switches when considered two by two. As will be readily understood, the reversing switch s1, s2 has for its action to exchange the paths followed by control voltages fed to 01 and 02, on the one hand and Op, on the other hand. The second reversing switch s3, s4 produces similarly an exchange of the paths followed by control signals feeding respectively Re and Rep.

The reversing relay RI is controlled by a relay BI having two stable positions and provided with two inputs et, er; the relay RI is in its operative or inoperative position according as to whether a signal is fed to either of said inputs. Said relay is provided with six contact-pieces i1 to i6 of which the first contact-piece i1 is connected with s2 for the inoperative position of the relay and with s1 for its operative position. Similarly, i2 is connected with s4 and s3 according as to whether the relay is inoperative or operative; i3 connects the motor MX with the forward motion connection Mv when the relay is operative and with the rearward motion connection Mr when the relay is inoperative. The contact-piece i4 establishes the opposite connections for the motor MY, the contact-piece i5 connects the front braking connection Fv with the brake Fx when the relay is inoperative and with the brake FY when the relay is operative and, lastly, the contact-piece i6 produces the reverse connections.

The relay ROR for "origin or repetition" is a relay with two stable positions of the same type as the forward and rearward operating relays RAV and RAR with an input t and an input r. Said relay includes three contact-pieces o1, o2 and o3. The first contact-piece o1 ensures the transmission of the signal produced by the indication input of the member AF/DAV towards the outputs for the indications of origin o1, o2 or Op when the relay ROR is in its operative or origin position and towards the indicating outputs Re or Rep corresponding to the pitch of repetition for its inoperative or repetition position, while the second contact-piece o2 provides for the grounding of the indication output P1 or P2 in its inoperative or repetition position only. The third contact-piece o3 is connected with the contact-piece a of the forward operation relay RAV which produces the stopping signal through grounding each time the two motion relays RAV and RAR are both simultaneously inoperative. Said signal is fed through o3 to the member MPR for producing pressure when the relay ROR is in its inoperative or repetition position or towards a relay RG when said relay ROR is in its operative or "origin" position.

Said relay RG corresponds to the beginning of a row and controls two contact-pieces g1 and g2 so as to provide a grounding when in its operative position respectively through AF/DAV and through a connection gf.

The latter feeds, on the one hand, the input *er* which returns the relay BI and, consequently, the reversing relay RI into its inoperative position, and, on the other hand, the input *r* for the return into its inoperative or repetition position of the relay ROR having two stable positions, through the agency of a delaying member 3*s* introducing a lag of say three seconds. The RD starting relay is controlled through the closing of the starting switch ID which connects simultaneously the input *t* for the origin of the relay ROR and the input *et* for the relay BI with the grounding connection *s*.

The relay RF or end of row relay includes in addition to the above-mentioned contact-piece *f*1 two further contact-pieces *f*2 and *f*3 which provides, when the relay is operative, for the grounding of AF/DAV, on the one hand and of the connection *gf*, on the other hand. Said relay is fed through the single contact-piece *zr* of the relay RZR which is the zero relay for the counter CP of the number of exposures in the row. The contact-piece *zr* is normally connected with the input of the member AF/DAV.

The contact-piece *zr* is connected with the output of the member LPR releasing the pressure through the agency of the contact-piece *zt* of the relay RZT which forms the zero relay of the counter CPT of the total number of exposures. When the relay is energized, it connects the contact-piece *zt* with a member RPC adapted to produce the return of the document carrier to its loading point.

Figure 9:
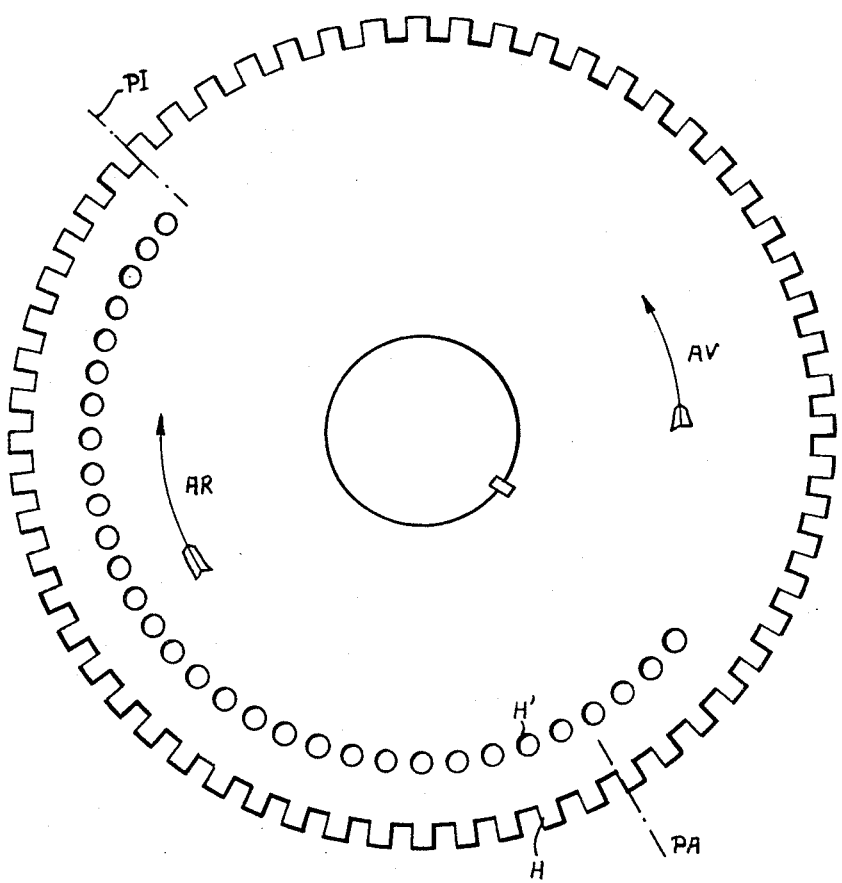
FIG. 9 is a detail view of a notched disc cooperating with the coordinate counter.
Figure 10:
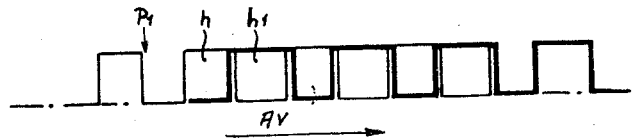
FIG. 10 is a diagram of the photo-electric pulses obtained with the disc according to FIG. 9.

FIGS. 9 and 10 illustrate the means used in accordance with the invention for defining the beginning of the counting after stoppage upon rearward motion at the exact moment of the passage through the corresponding axis. As already mentioned, each rearward motion, whether along the axis OX or along the axis OY, continues up to a predetermined position located beyond the perpendicular axis. Turning to FIG. 9 which illustrates one of the toothed discs DX or DY, the passage through the perpendicular axis corresponds to the passage in front of the photo-cell associated with the so-called initial point PI and the stoppage is obtained at the moment at which the so-called stopping point PA registers with said cell. In other words, during rearward motion, i.e. in the direction of the arrow AR, the release of the slowing down switch RAL is obtained before the passage of the initial point PI in front of the photo-cell; and the release of the stopping and braking switch is produced at the moment of the passage of said point PI and, at the moment of the actual stopping, a point such as PA registers with the cell.

Over a fraction of its periphery beginning at the position PI and finishing beyond the position PA, which fraction corresponds to about one half revolution in the case illustrated in FIG. 9, the disc includes a series of so-called neutralizing holes H' of which each is located in registry with a corresponding tooth H. A lamp and an auxiliary cell which are not illustrated are located to either side of the disc in registry with said series of holes. During normal operation, said auxiliary lamp is extinguished, while the auxiliary cell remains always in parallel with the normal cell, counting the pulses produced by the passage of the teeth H. The auxiliary lamp is ignited only for forward operation under the action for instance of the switch FAR which produces a stopping.

When, after a stopping during rearward motion, the point PA of the disc is in registry with the cells, the document-carrying means start forwardly, as illustrated by the arrow AV and the auxiliary photo-cell illuminated through the ports H' will produce pulses *hl* (FIG. 10) which are shifted by one half-period with reference to the pulses *h* fed by the normal cell. Consequently, there are no more any pulses produced and the coordinate counter cannot operate. When the last port or hole H' has passed, these neutralizing pulses *hl* cease and the first pulse *h* which is actually recorded by the coordinate counter corresponds to the passage in registry with the counting photo-cell of the initial point PI. Therefore, it is the passage of the last neutralizing port H' which corresponds to the passage through the axis OY or OX and it is always the same tooth of the disc which defines the origin of the counting. During the passage of the non-perforated fraction of the disc, the auxiliary lamp is extinguished so that, when the series of holes or ports passes again in front of the auxiliary cell, the latter receives no light and remains inoperative.

Through this arrangement, it is possible to accurately and reliably obtain a counting of the original coordinates, starting from the axes OX and OY, the mechanical clearances which may occur being necessarily compensated.

It should be remarked furthermore that if an error in the cutting or a dust deposit modifies the breadth of one tooth, the very slight error which may arise therethrough can act only on the stopping of said particular tooth and there is no possible addition during the revolutions of the disc, since the number of teeth remains invariable.

*Operation*

I will now describe the operation of the arrangement in the execution by way of example, of the programme perforated in accordance with FIG. 3 and as illustrated diagrammatically in FIG. 4.

The starting is performed at the loading point PC to which the document holder carriage returns automatically as will be explained hereinafter at the end of the execution of each programme. The perforated card being fitted inside the card holder, the control knob A/M is positioned for automatic operation, and it is sufficient to close the starting switch ID, so as to produce the execution of the programme in accordance with the perforations of the card.

The closing of ID produces simultaneously (FIG. 8) the passage into its operative position of the reversing relay RI, the passage into "origin" conditions of the relay ROR and the energization of the starting relay RD. The contact-piece *d*2 of the latter produces through AF/DAV the transmission of an order of indication and the passage into its operative position of the forward motion relay RAV; the contactpiece *d*1 produces, on the other hand, the passage of the rearward motion relay RAR into its inoperative position through the agency of the delaying means *ls*. The indicating order is directed through 01–*i*1 and *s*1 towards OP, so as to produce on the coordinate counter CC the recording or indication of the ordinate OP (FIG. 4) of the first row. The connections Mv for forward motion and Fv for braking during forward motion are transmitted through *i*4 and *i*6 to MY and FY, while the connections Mr for rearward motion and Fr for braking during rearward motion are transmitted through *i*3 and *i*6 to MX and FX.

The motor MY is thus subjected to the control of the speed varying means CHV and starts immediately, while the motor MX which is controlled by RAL(*x*) and FAR (*x*) starts with a predetermined delay, as defined by *ls*. The motor MV slows down gradually, as the coordinate OP is being neared and it stops exactly at the moment at which, under the action of the stopping signal A, the relay RAV passes back into its inoperative position and produces, through a dropping of its contact-piece *f*, a feeding of the brake FV. The rearward movement of MX continues, on the other hand, at a constant speed, until a certain distance from the axis OY is reached. At this moment, the switch RAL is released and switches off the feeding of the motor MX, after which FAR is released in its turn at the moment of the passage through OY and produces the braking through the return into its inoperative condition of RAR and dropping of the contact-piece *f*' feeding the brake FX. The document-holding carriage is stopped thus in the position illustrated by the point PA1 in FIG. 4.

The relays RAV and RAR are thus both inoperative and connect through their grounded contact-pieces *a*—*a*' the contact-piece o3 of the relay ROR which is still in its operative position or in its origin-searching position. This results in a feeding of the relay RG corresponding to the beginning of the row, which relay enters its operative position and closes its contact-pieces g1 and g2. The first contact-piece g1 produces a renewed operation of the member AF/DAV for indicating and starting forwardly, while the contact-piece g2 produces through gf the immediate rocking of the reversing relay RI and, through the agency of delaying means s3, the dropping into repetition condition of ROR. The forward operation relay RAV is thus the only one fed and RI having dropped, MX and FX are now connected respectively through i3 with Mo and through i5 with Fv. Furthermore, the indicating order being transmitted through o1 which is now operative and i1 which has dropped now to s2 and through q1 to O1, it is therefore the abscissa O1 of the origin of the first row which is recorded or indicated on the coordinate counter CC and the motor MX fed under the control of the speed-varying means CHV starts searching said origin. At the end of the lag 3s, the relay ROR drops back into its position of repetition and produces through the grounding of its contact-piece o2 the transmission of a recording or indication order which is transmitted by q2 to the area P1 of the card holder. This leads to a recording on the counter CP of the number of exposures of the first row.

When the first exposure point is reached, the stop signal A produces a dropping of the relay RAV and locks thus the brake FX, closes the contact-piece s and feeds through the contact-piece o3 of the relay ROR which has dropped back into its position of repetition the motor MPR producing pressure. Said motor makes the document-carrying means sink into contact with the sensitive surface and it produces, when the recorded value of the pressure is reached, illumination of the lamp L through the agency of the time switch T. When the duration of exposure defined by the latter is at an end, the time switch deenergizes the lamp and produces the feeding of the motor LPR which releases pressure; said motor raises the document-carrying means and at the end of the stroke it sends a counting pulse into the input of the counters CP and CPT of the number of exposures and, at the same time, towards the recording member AF/DAV for recording and for forward starting through the contact-pieces zt and zr which are both inoperative. The indicating or recording order is directed now through o1, i2 and s3 towards Re, which produces the recording on the coordinate counter CC of the measurement PR corresponding to the pitch of repetition. The forward movement relay RAV returning into its inoperative condition starts the motor MX under the control of the speed-varying means CHV and movement begins again for a search of the second point of the row in which the same operations are repeated.

The operation continues thus up to the last exposure of the first row. When this last exposure has been executed, the zero relay RZR of the counter CP causes its contact-piece zr to rock, so as to direct the pulse transmitted by LPR onto the relay RF for the end of the row. The contact-piece f' of the latter provides a rocking of the rearward motion relay through the agency of the delaying means ls, the contact-piece f2 producing through AF/DAV a recording and a forward start, while the contact-piece f3 produces a rocking of the reversing relay RI and, through the agency of the delaying means at 3s, the relay ROR is shifted from "repetition" to "origin." A connection which is not illustrated passing through the staggered contact-piece Q of the card holder produces a rocking of the staggering relay RQ. The recording pulse is directed through o1, i2 and s3 towards Rep. The motor MY and its brake FY are furthermore connected through i4 and i6 with the relay for forward movement, while MX and FX are connected through i3 and i5 with the rearward motion relay. This results in a forward movement Y which stops when the distance PRP (FIG. 4) has been travelled over and in a rearward motion X which continues until the stopping point PA2 is reached in registry with the second row.

The relay ROR having changed condition during this time, the stoppage signal obtained through the simultaneous closing of the contact-pieces aa' is transmitted through o3 to the relay RG for the beginning of the row. The energization of the latter relay produces, as already disclosed, for the beginning of the first row, the searching of the first exposure point of the second row with the sole difference consisting in that RQ having rocked, the recording order from AF/DAV is directed towards 02, while the recording order due to the grounding of the contact o2 is directed towards P2.

The operation is then continued for the second row in the manner already disclosed for the first row, until the end of the last exposure in the second row, said end producing again the operation of the zero relay RZR and the energization of the relay RF corresponding to the end of a row. Last-mentioned relay rocks again the staggering relay BQ having two stable positions and returns into its inoperative position the staggering relay RQ, so that after the document holder has reached the stopping point PA3 in registry with the third row, the latter will be travelled over in the same manner as the first row. The operation continues thus until, the total number of exposures being recorded, the counter CPT energizes its relay RZT which provides a rocking of its contact-piece zt. The impulse at the end of the stroke of the motor releasing pressure LPR is thus directed towards the arrangement RPC which ensures the return of the document holder towards its loading point. This arrangement produces in succession, as illustrated by the diagram of FIG. 4, the return to the stopping point PA4 into registry with the last row and then the actual return towards the loading point Pc. Said return is obtained, on the one hand, by connecting the motor MY for rearward movement, which ensurses a return movement beyond the axis OX and, on the other hand, by positioning the motor MX for forward movement after recording on the coordinate counter CC an arbitrary predetermined coordinate. Said coordinate is equal in the case of the example considered to one half of the stroke of the document-holding carriage along the axis OX. The loading position which is assumed automatically by the document holder after execution of each programme lies thus in the middle of the breadth of the machine.

The details of the arrangement RPC for the return to the loading point have not been illustrated, but they may be readily imagined starting from the above disclosure.

It has been assumed in the case of the example considered that the return to zero of the counter CPT of the total number of exposures registers with the end of the last row; in other words, the programme includes an even number of rows. As already mentioned, said condition is not essential. The last exposure may be located at any position in the last row, the exposure made covering altogether only a fraction of the sensitive area. The apparatus allows as a matter of fact, the execution on a same sensitive surface of a second programme for impressing with a different negative at least a portion of the remaining surface; said second programme is obviously carried by another perforated card. The position C0 for the change of the perforated origin in this card allows beginning work for a position of the first exposure which lies at any point of the sensitive surface, after which there is defined for the rows other than the first row another suitable origin through a rocking of the staggering relay RQ.

The invention is obviously not limited to the embodiment selected and illustrated by way of example. Thus, the operations started again and executed automatically at each repeating position may be different without the remainder of the control requiring any modification whatever. As a matter of fact, the member MPR of the diagram of FIG. 8 may be replaced by a relay releasing any desired operation, while the member LPR may be replaced by another relay producing a signal at the moment of the end of said operation.

The programme considered may include the two different types of rows of repetition possibly with different or variable values of the pitch of repetition or the like. On the other hand, the counters may be executed in accordance with various techniques known per se. Thus, for instance, the use of special tubes allows replacing the multiple indicating inputs of a same ten-input device by a single indicating input, the definition of the positions being obtained for instance by modifying the levels of the indicating signal voltages.

What I claim is:

1. In a repeating photo-mechanical copying machine for offset and the like printing on a photosensitive surface, the provision of an automatic control system comprising a frame adapted to be shifted over the photosensitive surface, two motors controlling the frame to make the latter assume two independent intermittent movements in two different directions in a common plane parallel with said sensitive surface and remain stationary in a series of predetermined uniformly spaced positions lying in a succession of rows parallel to the direction of the first movement of the frame, a pulse producer controlled by each motor and adapted to produce an electric pulse for successive predetermined fractions of the elementary movements of the frame under the action of said motor, coordinate counters adapted to count said pulses to deduct same from a predetermined amount defining the desired length of intermittent movement of the frame to be obtained by the corresponding motor, means controlled by the coordinate counters to transmit a succession of slowing down signals when the figure obtained through said deduction of the pulses drops under predetermined values, means whereby the obtention of a zero figure through said deduction produces a stopping signal of the corresponding motor, speed-modifying means controlled by the slowing down signals and adapted to slow down the corresponding motor when running forwardly, slowing down means controlling the motor when moving the frame rearwardly upon said frame reaching a first predetermined position, means for stopping automatically the last-mentioned motor for a predetermined second position of the frame to the rear of said first position, and a system controlling operation and reversal of the motors in a predetermined sequence.

2. In combination with a repeating photomechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system including a perforated carrier carrying programming indications of the spacings between said positions on the rows and between the rows, of the location of the first position in each row, of the location of the first row, of the number of positions in each row and of the total number of exposures to be obtained, counters showing the lengths travelled by the frame in both directions, the total number of positions occupied by the frame in succession in each row and the total number of positions occupied by the frame in succession, and a central station controlled by said counters and by the indications on the perforated carrier and controlling the speed and direction of rotation of the motors.

3. In combinaiton with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system including a perforated carrier carrying programming indications of the spacings between said positions on the rows and between the rows, of the location of the first position in each row, of the location of the first row, of the number of positions in each row and of the total number of exposures to be obtained, counters showing the lengths travelled by the frame in both directions, the number of positions occupied by the frame in succession in each row and the total number of positions occupied by the frame in succession, a central station controlled by said counters and by the indications on the perforated carrier and controlling the speed and direction of rotation of the motors, and means whereby said central station controls the application of the actual copying machine onto the sensitive surface at each stoppage of the frame in the successive positions occupied by it in the successive rows, the operation of said machine and the restarting of the motors after each operation of said machine.

4. In combination with a repeating photomechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system including a perforated carrier carrying programming indications of the spacings between said positions on the rows and between the rows, of the location of the first position in each row, of the location of the first row, of the number of positions in each row and of the total number of exposures to be obtained, discs provided each with an annular series of openings and controlled by the corresdonding motor to rotate by one spacing between its openings for each fractional progression of the motor by an elementary amount, a photo-cell associated with each disc, a source of light cooperating with each disc and photo-cell to produce a pulse at each elementary progression, counters controlled by said pulses and showing the lengths travelled by the frame in both directions, means controlled by the perforated carrier and by said counters controlling the speed, direction of rotation and stopping of the motors according to the programme defined by the perforated carrier.

5. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system including a perforated carrier carrying programming indications of the spacings between said positions on the rows and between the rows, of the location of the first position in each row, of the location of the first row, of the number of positions in each row and of the total number of exposures to be obtained, discs provided each with an annular series of openings controlled by the corresponding motor to rotate by one spacing between its openings for each fractional progression of the motor by an elementary amount, a photo-cell associated with each disc, a source of light cooperating with each disc and photo-cell to produce a pulse at each elementary progression, and differential means controlled by the perforated carrier and by said pulses to define the speeds, directions of operation and stoppages of the motors according to the programming indications in the perforated carrier and controlling also operation of the copying machine for each operative position of the frame.

6. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operating positions along predetermined rows and from one row to the next in the other direction, and an electronic control system including a perforated carrier carrying programming indications of the spacings between said positions on the rows and between the rows, of the location of the first position in each row, of the location of the first row, of the number of exposures to be obtained, discs provided each with an annular series of openings controlled by the corresponding motor to rotate by one spacing between its openings for each fractional progression of the motor by an elementary amount, a photo-cell associated with each disc, a source of light cooperating with each disc and photo-cell to produce a pulse at each elementary progression, and differential means controlled by the perforated carrier and by said pulses to define the distance separating the frame from the next operative position it is to occupy along either direction and to slow down the corresponding motor upon the frame nearing said operative position, means producing, when the last-mentioned distance is equal to zero, the stoppage of the frame, means controlled by the perforated carrier and controlling the operation of the copying machine for each operative position of the frame and restarting the frame on its path after the exposure time has elapsed.

7. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system controlling the successive movements of the two motors in accordance with the programme recorded on a perforated carrier and including means for gradually slowing down each motor moving forwardly as it makes the frame move nearer the end of its operative stroke in the corresponding direction, slowing down means controlling the motor moving the frame in the direction parallel with the rows when shifting the frame rearwardly towards a first predetermined position on a row, and means for stopping the last-mentioned motor still moving rearwardly for a perdetermined further position of the frame on said row.

8. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, discs provided with two concentric series of openings and controlled by the corresponding motors to rotate by one spacing between the openings of one series for each fractional progression of the motor by an elementary amount, the first series of openings extending throughout 360° and the second series extending over a fraction of a circumference corresponding to the movement of the frame under the action of the corresponding motor between a reference axis and a point beyond the rear of said axis outside the operative area of the sensitive surface, two photo-cells inserted in parallel and registering with the corresponding series of openings in each disc, sources of light illuminating the photo-cells through the corresponding series of disc openings to produce a pulse for each elementary forward progression of the frame beyond said reference axis, means producing programming signals and differential means controlled by said signal-producing means and by the pulses and controlling the movements of the frame in accordance with the programme defined by the signal-producing means.

9. In combination with a repeating photo-mechanical copying machine operating over a sensitive surface, the provision of an automatic control system comprising a support for the sensitive surface, a movable frame carrying the machine, two superposed carriages adapted to move in two directions over said sensitive surface and of which the upper carriage is rigid with the frame, a screw carried revolvably by the support, controlling the sliding of the lower carriage in the corresponding direction, a screw carried revolvably by the lower carriage and controlling the sliding of the upper carriage in the corresponding direction, two motors controlling said screws to produce the intermittent progression of said frame along a predetermined path respectively in one direction by equal successive amounts between successive operative positions in predetermined rows and from one row to the next in the other direction, an electronic control system including a perforated carrier, means controlled by the perforated carrier and defining the movements of the motors to make the frame follow in succession the different rows through the different operative positions thereon to shift the frame between the final operative position on each row and a position outside the operative area of the sensitive surface to the rear of the operative position on said next row, further means for gradually slowing down the motors moving forwardly as they make the frame move nearer the next operative position for one motor and nearer the next row for the other motor, a cam member mounted on the carriage moving in said one direction, a stationary switch cooperating with said cam and adapted to slow down the motor providing movement in the direction of the rows when moving rearwardly beyond the operative area on the sensitive surface and to stop the last-mentioned motor still moving rearwardly for a predetermined further position of the frame on said row.

10. In combination with a repeating photo-mechanical copying machine operating over a sensitive surface, the provision of an automatic control system comprising a support for the sensitive surface, a frame carrying the machine, two superposed carriages adapted to move in two directions over said sensitive surface and of which the upper carriage is rigid with the frame, a screw carried revolvably by the support and controlling the sliding of the lower carriage in the corresponding direction, a screw carried revolvably by the lower carriage and controlling the sliding of the upper carriage in the corresponding direction, two motors controlling said screws to produce the intermittent progression of said frame along a predetermined path respectively in one direction by equal successive amounts between successive operative positions along predetermined rows and from one row to the next in the other direction, an electronic control system controlling the successive movements of the two motors in accordance with the programme recorded on a perforated carrier, an electro-magnetic brake including pole-pieces rigid with each carriage, and means controlled by the perforated carrier of the control system to operate said electromagnetic brake whenever the carriage progression nears predetermined operative positions on its path.

11. In combination with a repeating photomechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, means whereby each motor produces a pulse for each fractional progression of the motor by an elementary amount, and an electronic control system including a perforated carrier carrying programming indications of the spacings between said positions on the rows and between the rows, of the location of the first position in each row, of the location of the first row, of the number of positions in each row and of the total number of exposures to be obtained, a coordinate counter including a plurality of digit inputs adapted to be fed by the pulses, an input for the indicating signals fed by the perforated carrier, and an output measuring the difference between the inputs, a relay controlled by said output and adapted to slow down and stop the pulse-producing motor when the difference measured by the counter approaches zero.

12. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, means whereby each motor produces a pulse for each fractional forward progression of the motor by successive elementary amounts measured in digits of decreasing units of length, and an electronic control system including a perforated carrier provided with programming indications of the spacings, measured by digits of decreasing units of length defining said progressions of the motors between the successive operative positions of the frame on the rows and between the rows, of the location of the first position in each row, of the location of the first row, of the number of positions to be obtained in each row and of the total number of positions to be occupied, a coordinate counter including a multiple digit input adapted to be fed by the pulses of the operative motor, an input for the corresponding digit-indicating signals fed by the perforated carrier, and an output measuring the difference between said inputs and a relay controlled by the output of the coordinate counter and adapted to slow down the pulse-producing motor when the difference measured by the counter approaches zero.

13. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system including a perforated carrier subdivided into areas of programming indications relating respectively to the spacings between said positions on the rows and between the rows, to the location of the first position in each row, to the location of the first row, each area forming a plurality of columns of digits of units of decreasing magnitude, a holder for the perforated carrier provided with position-indicating areas and columns registering with the corresponding areas and columns of the perforated carrier, contact-making projections adapted to be urged elastically against the corresponding locations of the perforated carrier, and, in combination with said holder, a cover adapted to press said carrier against said projections, and a series of electrically energized bars carried by said cover in registry with the different columns and feeding current through the projections registering with perforations in the carrier to the corresponding points of the holder, counters controlled by the currents fed to said points of the holder, and a central station controlled by said counters and by the distances actually travelled over by the frame and controlling the speed and direction of rotation of the motors in accordance with the indications carried by the perforated carrier.

14. In combination with a repeating photo-mechanical copying machine operating over a sensitive surface, the provision of an automatic control system comprising a movable frame carrying the machine and adapted to move in two directions over said sensitive surface, two motors adapted to produce the intermittent progression of said frame along a predetermined path respectively in one direction by equal successive amounts between successive operative positions along predetermined rows and from one row to the next in the other direction, and an electronic control system including a perforated carrier subdivided into areas of programming indications relating respectively to the spacings between said positions on the rows and between the rows, to the location of the first position in each row, to the location of the first row, each area forming a plurality of columns of digits of units of decreasing magnitude, a holder for the perforated carrier provided with position-indicating areas and columns registering with the corresponding areas and columns of the perforated carrier, contact-making projections adapted to be urged elastically against the corresponding locations of the perforated carrier, and, in combination with said holder, a cover adapted to press said carrier against said projections, and a series of electrically energized bars carried by said cover in registry with the different columns and feeding current through the projections registering with perforations in the carrier to the corresponding points of the holder, a starting and indicating relay associated with each area and adapted, when energized, to energize in its turn the points of the holder register with the perforations in the corresponding area of the carrier, counters controlled by the currents fed to said points of the holder, and a central station controlled by said counters and by the distances actually travelled over by the frame and controlling the speed and direction of rotation of the motors in accordance with the indications carried by the perforated carrier.

15. In an automatic control system as claimed in claim 13, the provision of further areas on the perforated carrier and on its holder defining respectively the number of positions to be occupied in each row and the total number of positions to be occupied by the frame over the sensitive surface, and means whereby at least one motor is reversed when said number of positions is reached in each row and at the end of operation.

16. In an automatic control system as claimed in claim 13, the provision of further areas on the perforated carrier and on its holder defining respectively the number of positions to be occupied in each row and the total number of positions to be occupied by the frame over the sensitive surface, a counter of the number of positions occupied in succession in each row, and a counter of the total number of positions occupied over the sensitive surface, and means controlled by the corresponding areas and adapted to provide further operation in conformity with the indications of the perforated carrier upon coincidence between the numbers counted by the counters and those defined by the corresponding areas.

17. In an automatic control system as claimed in claim 13, the provision of further areas on the perforated carrier and on its holder defining respectively the number of positions to be occupied in each row, a counter of the number of positions occupied in succession in each row, said counter including a multiple input, further projections associated with said further areas and connected with said input, and a relay energized upon starting of operation and ensuring energization of said further projections to define the actual number of positions occupied in the successive rows.

18. In an automatic control system as claimed in claim 13, adapted to provide operation on successive rows, the odd and even rows having different spacings between the successive positions thereon, the provision of further areas on the carrier and on its holder defining the different spacings in the odd and in the even rows.

19. In an automatic control system as claimed in claim 13, adapted to provide operation on successive rows, the odd and even rows having different spacings and starting points between the successive points thereon, the provision of further areas on the carrier and on its holder defining the different spacings and starting points in the odd and in the even rows, respectively.

20. In an automatic control system as claimed in claim 13, the provision of two auxiliary perforations in the perforated carrier and contact-pieces associated with said perforations to define the motor to be associated with each direction of movement of the frame.

21. In an automatic control system as claimed in claim 13, adapted to provide operation on successive rows, the odd and even rows having different spacings and starting points between the successive positions thereon, the provision of further areas on the carrier and on its holder defining the different spacings and starting points in the odd and in the even rows, and a relay controlled by the carrier and adapted to energize selectively and alternatingly one of the two starting point areas and one of the two spacing areas.

22. In an automatic control system as claimed in claim 13, adapted to provide operation on successive rows, the odd and even rows having different spacings and starting points between the successive positions thereon, the provision of further areas on the carrier and on its holder defining the different spacings and starting points in the odd and in the even rows, and a relay controlled by the perforated carrier and adapted to change the location of the first position in the alternate rows in accordance with the indications of the starting areas.

23. In an automatic control system as claimed in claim 13, the combination of a rearward movement relay, a forward movement relay, means controlled by said rearward movement and forward movement relays respectively for slowing down and stopping each motor at the end of its rearward and forward movements, and means whereby the central station controls said relays in a predetermined sequence.

24. In an automatic control system as claimed in claim 13, adapted to provide operation on successive rows, the odd and even rows having different spacings and starting points between the successive positions thereon, the provision of further areas on the carrier and on its holder defining the different spacings and starting points in the odd and in the even rows, a relay controlled by the carrier and adapted to energize selectively and alternatingly one of the two starting point areas and one of the two spacing areas, an indicating relay adapted to energize the projections on the holder and said selecting relay, and a reversing relay in series with last-mentioned relay.

25. In an automatic control system as claimed in claim 13, adapted to provide operation on successive rows, the odd and even rows having different spacings and starting points between the successive positions thereon, the provision of further areas on the carrier and on its holder defining the different spacings and starting points in the odd and in the even rows, a relay controlled by the carrier and adapted to energize selectively and alternatingly one of the two starting point areas and one of the two spacing areas, an indicating relay adapted to energize the projections on the holder and said selecting relay, a reversing relay in series with last-mentioned relay, said selecting relay being adapted to shift the signals passing out of the indicating relay selectively into either of the starting point areas, brakes cooperating with the motors, and means whereby the selecting relay controls the brakes for forward and rearward motion of both motors selectively.

26. In an automatic control system as claimed in claim 13, the provision of further areas on the perforated carrier and on its holder defining respectively the number of positions to be occupied in each row and the total number of positions to be occupied by the frame over the sensitive surface, a counter of the number of positions occupied in succession in each row, a counter of the total number of positions occupied over the sensitive surface, means controlled by the corresponding areas and adapted to provide further operation in conformity with the indications of the perforated carrier upon coincidence between the numbers counted by the counters and those defined by the corresponding areas, further areas on the carrier and on its holder defining the different spacings and starting points in the odd and in the even rows, a relay adapted to transmit the indicating signals selectively from the different areas and means whereby said relay produces stop signals selectively for return to operation in the next successive row and for return to starting conditions.

27. In an automatic control system as claimed in claim 13, the combination of a rearward movement relay, a forward movement relay, means controlled by said rearward movement and forward movement relays respectively for slowing down and stopping each motor at the end of its rearward and forward movements, means whereby the central station controls said relays in a predetermined sequence, and means whereby the stop signal is produced through the simultaneous deenergization of the forward and rearward progression relays.

28. In an automatic control system as claim in claim 13, the combination of a rearward movement relay, a forward movement relay, means controlled by said rearward movement and forward movement relays respectively for slowing down and stopping each motor at the end of its rearward and forward movements, means whereby the central station controls said relays in a predetermined sequence, further areas on the carrier and on its holder defining the different spacings and starting points in the odd and in the even rows, a starting relay in the central station, and a relay for stopping operation in the successive rows.

29. An arrangement as claimed in claim 28, including returning means adapted to produce in succession a rearward motion of the frame along the direction of the rows, the indication of a predetermined spacing in one direction, forward motion in said one direction, and rearward motion in the other direction.

30. In an automatic control system as claimed in claim 13, the combination of a rearward movement relay, a forward movement relay, means controlled by said rearward movement and forward movement relays respectively for slowing down and stopping each motor at the end of its rearward and forward movements, means whereby the central station controls said relays in a predetermined sequence, further areas on the carrier and on its holder defining the different spacings in the odd and in the even rows, the starting relay producing an indicating signal and a forward signal adapted to energize the forward progression relay for one motor, and delaying means through which the last-mentioned signal energizes the rearward motion relay for the other motor.

31. In an arrangement as claimed in claim 13, the combination of means whereby a releasing pulse produces the different operative steps and a further pulse terminates operation.

32. In an arrangement as claimed in claim 13, the combination of means whereby a releasing pulse produces the different operative steps, counters of the numbers of positioning operations executed in each row and throughout the sensitive area respectively, means for distributing the pulse corresponding to the end of operation to the inputs of the counters of the numbers of operations, means for feeding same to the inputs of the indicating and forward movement relays, reversing means controlled by the zero outputs of the counters, the two last-mentioned counters, when reaching their zeros, feeding the pulses defining the end of the corresponding operation to the relay defining the end of the row, and to means for returning to the starting point respectively.

References Cited in the file of this patent

UNITED STATES PATENTS

| | | |
|---|---|---|
| 1,787,662 | Boedicker | Jan. 6, 1931 |
| 2,369,981 | Reyniers | Feb. 20, 1945 |
| 2,574,392 | Huebner | Nov. 6, 1951 |
| 2,690,696 | Ashton | Oct. 5, 1954 |